United States Patent [19]
Kunst et al.
[11] Patent Number: 5,063,515
[45] Date of Patent: Nov. 5, 1991

[54] AUTOMOTIVE ENGINE SIGNAL DIGITIZATION

[75] Inventors: Neil W. Kunst; James D. Fraser; Josephina Amaro, all of Tucson, Ariz.

[73] Assignee: Clean Air Technologies Inc., New York, N.Y.

[21] Appl. No.: 374,026

[22] Filed: Jun. 30, 1989

[51] Int. Cl.[5] .............................. G01M 15/00

[52] U.S. Cl. .............................. 364/431.01; 364/431.03; 364/431.12

[58] Field of Search .............................. 364/431.01, 431.03, 364/431.04, 431.12, 424.03, 451.01; 73/117.3

[56] References Cited

U.S. PATENT DOCUMENTS 4,467,327 8/1984 Kling et al. .............................. 364/431.04
4,472,779 9/1984 Marino et al. .............................. 364/431.01
4,476,531 10/1984 Marino et al. .............................. 364/431.01
4,502,324 5/1985 Marino et al. .............................. 364/431.12
4,812,979 5/1989 Hermann et al. .............................. 364/431.01

*Primary Examiner*—Salvatore Cangialosi
*Attorney, Agent, or Firm*—Schweitzer, Cornman & Gross

[57] ABSTRACT

A vehicle ignition signal is sensed and digitized for subsequent display on a display device, the digitization comprising sampling the sensed signal at a number of predetermined time intervals, all shorter in duration than an interval determined by the display device resolution, to determine a signal transition to a maximum spark value, to determine the maximum spark value, and to determine the sample within each display resolution interval having the greatest absolute value displacement from that of the determined sample from the previous resolution interval, the determined sample and the maximum value sample being displayed on the display device.

17 Claims, 19 Drawing Sheets

136

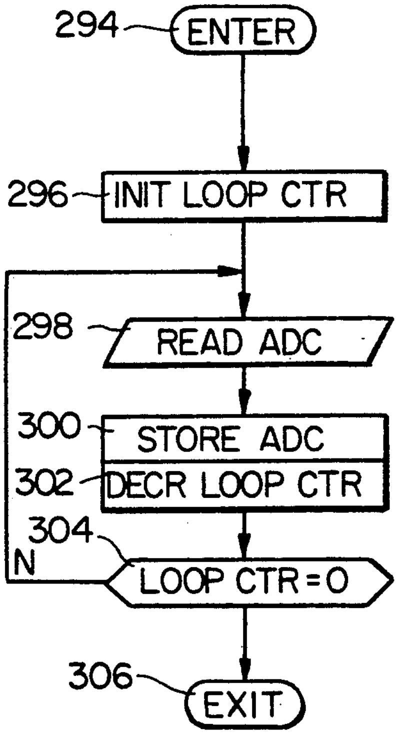
*FIG. 17*
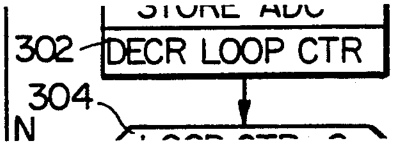

AUTOMOTIVE ENGINE SIGNAL DIGITIZATION

TECHNICAL FIELD

This invention relates to automotive engine diagnostic equipment, and more particularly to digitization and display of sensed engine signals.

BACKGROUND ART

The early prior art of automotive test equipment is characterized by the use of separate test instruments, such as ammeters, tachometers and oscilloscopes. The operator uses the oscilloscope to view automotive signals in real time The more modern art features computer-based testers that integrate the individual test instrument functions. These testers have a video monitor for display of test procedures and results. Also, the testers often provide a digital scope capability in which signal waveforms are displayed in the traditional oscilloscope format.

However, display inaccuracies occur in modern testers due to the limited resolution of the video monitor (typical horizontal resolution being 640 picture elements (pixels)). Specifically, this occurs when digitizing and displaying a high frequency portion of a sensed engine signal (e.g., the portions of the primary and secondary ignition voltage signals occurring upon and after spark and dwell) in conjunction lower frequency portions of the signal. Often, the digitization apparatus includes an analog to digital converter that samples the signals at a higher rate than the monitor resolution. Thus, to obtain an accurate representation of the entire signal (e.g., one cycle) on the display screen, it becomes necessary to decide which samples to keep and which samples to ignore.

DISCLOSURE OF INVENTION

The object of the present invention is to provide an accurate video display of a digitized version of a sensed automotive ignition signal.

According to the present invention, an automotive ignition signal having a maximum spark value and varying frequency and amplitude thereafter is sensed, and the sensed signal is sampled at predetermined first, second and third time intervals all less in duration than a fourth predetermined time interval determined by the display resolution of a display device, the sensed signal being sampled at the first predetermined time intervals to determine a signal transition towards a maximum value by comparing the first interval samples to a predetermined value for exceedence thereof, any one of the first interval samples during a corresponding one of the fourth intervals in which the signal transition has not occurred being stored for subsequent display, the sensed signal being further sampled at second predetermined time intervals to determine the maximum value, the maximum value signal being stored for subsequent display, the sensed signal being further sampled at third predetermined time intervals, the third interval samples during each fourth interval being examined to determine the one having the greatest absolute displacement from the greatest displacement signal determined during the previous fourth interval, each greatest displacement signal being stored for subsequent display on the display device. In further accord with the present invention, a display device displays the stored signals as an associated pixel in an amplitude versus time graphical display.

The invention has utility in providing an accurate display of typical automotive ignition signals to the operator of modern automotive engine diagnostic equipment, the displayed signals aiding the operator in making a diagnosis of the automotive ignition system.

Other objects, features and advantages of the present invention will become more apparent in light of the following detailed description of exemplary embodiments thereof, as illustrated in the accompanying drawing.

BRIEF DESCRIPTION OF DRAWING

FIGS. 15–19 are flowchart diagrams used by the apparatus of the present invention for digitizing the exemplary ignition system waveform of FIG. 13.

BEST MODE FOR CARRYING OUT THE INVENTION

Figure 1:
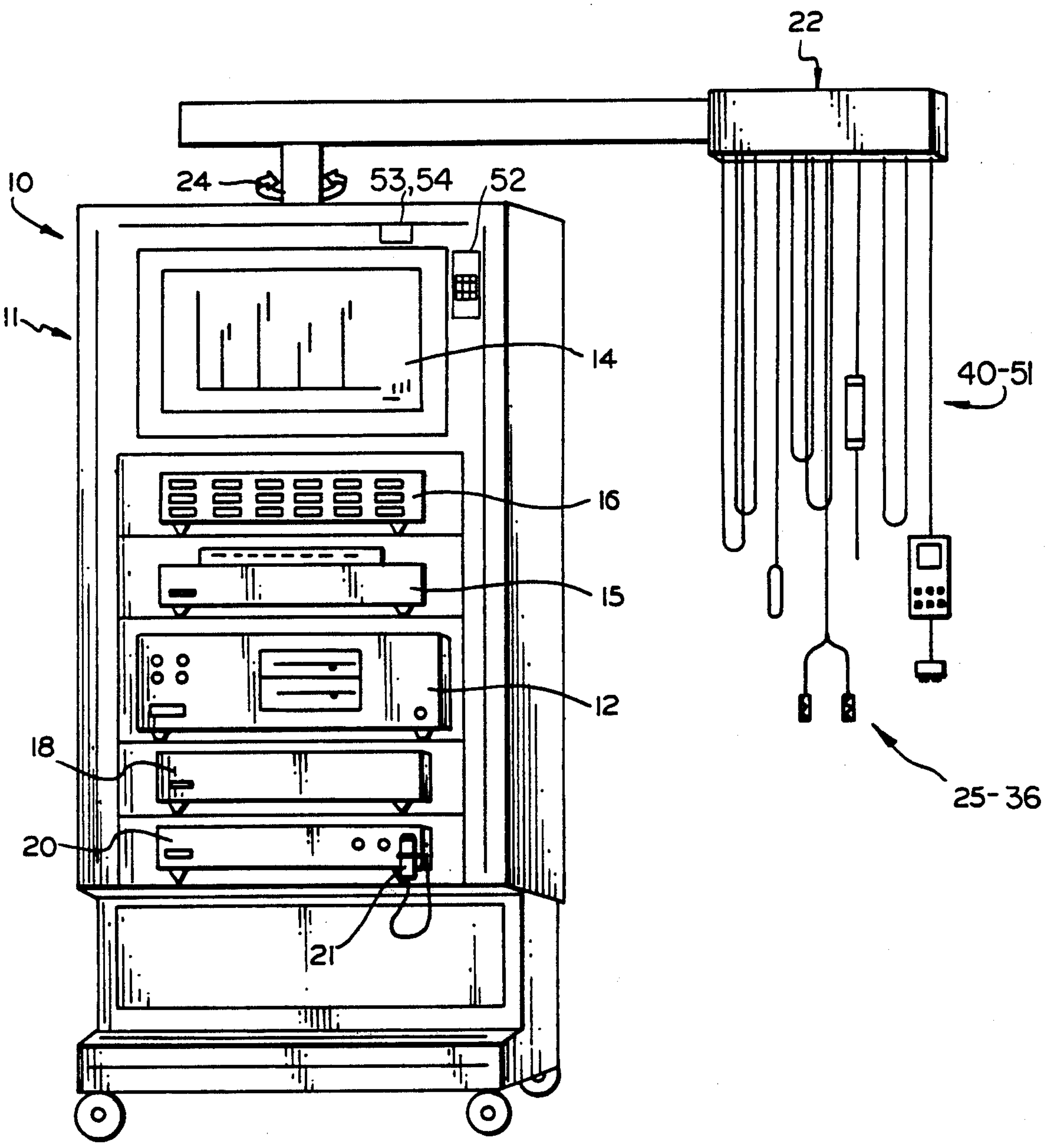
FIG. 1 is a perspective illustration of one type of automotive diagnostic equipment in which the present invention may be used.

Referring to FIG. 1, the present invention may be used in equipment 10 that aids an operator in the diagnosis and repair of automobiles. The equipment 10 is computer-based to provide automated testing of vehicle-mounted components and subsystems, including ignition, electrical, fuel and emission systems, and on-board computers. The equipment includes a transportable console 11 which houses a customer interface unit (CIU) computer 12, video monitor 14, printer 15, keyboard 16, data acquisition unit (DAU) 18, and computerized emissions analyzer (CEA) 20.

The CIU 12 is the main data processing unit and is described, together with the monitor 14, printer 15 and keyboard 16, in more detail hereinafter with respect to FIG. 4. The DAU 18 is the primary signal processing unit and is described in more detail hereinafter with respect to FIG. 3. The CEA 20 is a microprocessor-based unit that measures vehicle exhaust gas concentrations. The CEA 20, including exhaust probe 21, is compliant with the BAR-84 and BAR-90 emissions test standards.

The equipment also includes a rotatable boom 22 (as indicated by the rotational arrowheads 24) housing a plurality of engine probes 25–36 connected to the boom by corresponding signal lines 40–51.

Figure 2:
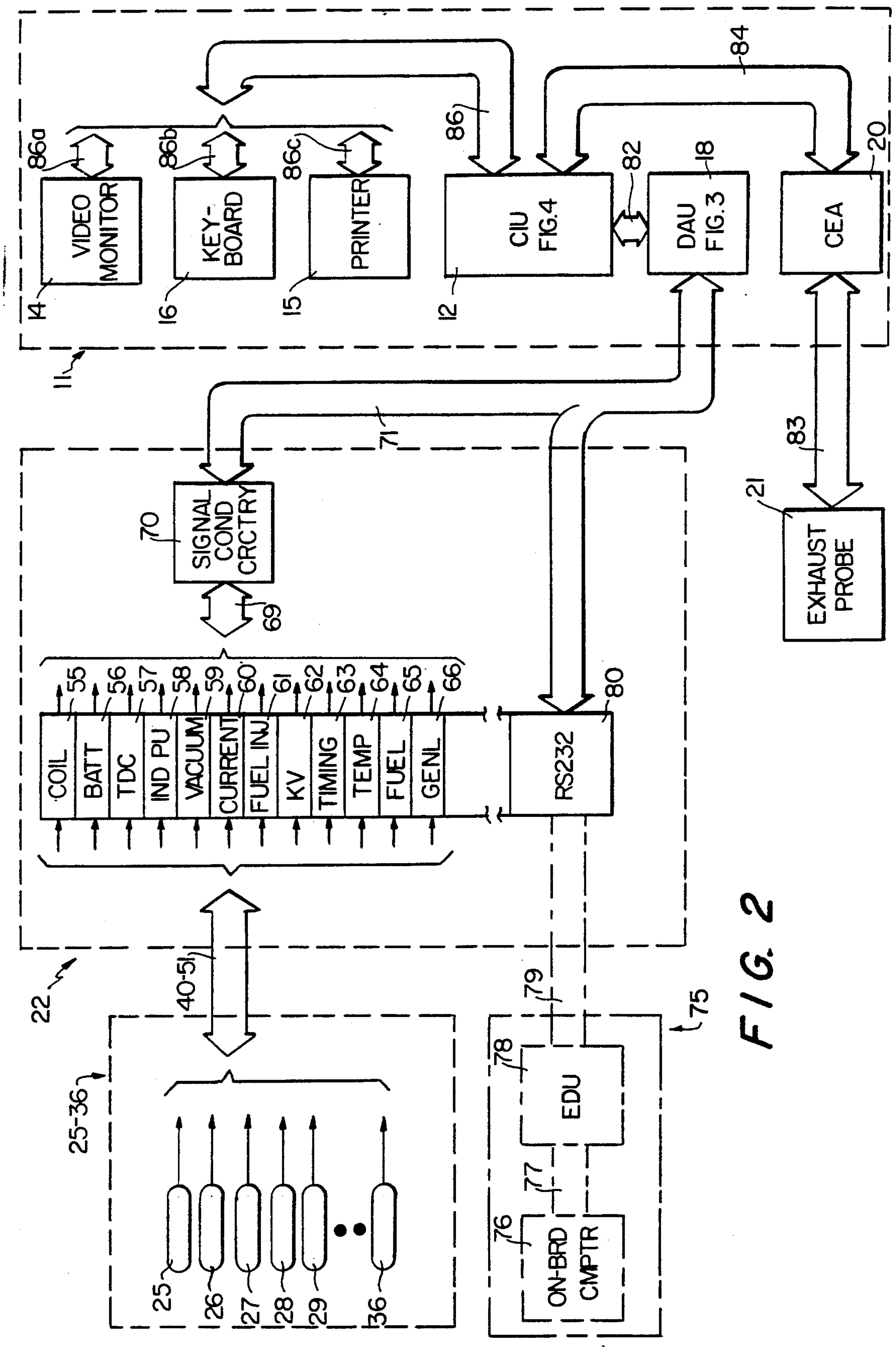
FIG. 2 is a block diagram of the automotive diagnostic equipment of FIG. 1.

FIG. 2 is a block diagram of the equipment 10. The engine probes 25–36 include coil probes 25 for measuring the vehicle ignition coil primary voltage, battery leads 26 for measuring battery voltage, a top dead center (TDC) probe 27 for sensing the TDC identification notch on the engine vibration damper, an inductive pickup 28 for measuring the number one (#1) cylinder spark firing signal, and a vacuum sensor 29 for measuring intake manifold vacuum.

Other probes include a current probe 30 for measuring battery and starter currents, a fuel injection probe 31 for measuring the fuel injection solenoid pulse, a KV probe 32 for measuring per cylinder peak spark plug firing voltage and spark duration, a timing light 32 for measuring engine timing when the TDC probe 27 is not used, a temperature probe 34 for measuring various engine temperatures, a fuel pressure probe 35 for measuring fuel pressure, and two general purpose multimeter leads 36 for making various resistance and voltage measurements.

The signal lines 40–51 attach to the boom 22 with corresponding known type connectors 55–66. The lines are insulated to protect them from the harsh garage environment. The sensed signals are presented on signal lines 69 to signal conditioning circuitry 70, which presents the conditioned signals on signal lines 71 to the DAU 18.

Apparatus 75 comprises an on-board computer (OBC) 76, signal lines 77, a portable electronic diagnostic unit (EDU) 78, and communications link 79. The phantom lines indicate that the apparatus 75 is not part of the equipment 10, but only connects to the equipment at the boom 22.

The OBC 76 is installed on recent model year vehicles and provides signals indicative of vehicle performance on the lines 77 to a connector (not shown) located either under the vehicle hood or in the vehicle passenger compartment. The EDU 78, which accesses the connector, may comprise a Monitor 2000, provided by OTC Tool & Equipment Division, Sealed Power Corporation, Owatonna, Minnesota, or equivalent scanner tools. The Monitor 2000 is a hand held unit with a single line, nine character alphanumeric display and provides the performance signals on the communications link 79, typically an RS232 serial data link. The link 79 connects to the boom 22 at an RS232 connector 80, which presents the performance signals on the lines 71 to the DAU 18. By connecting the EDU to the equipment 10, a greater number of parameters can be displayed on the monitor 14 than on the EDU itself.

The DAU communicates with the CIU 12 by a communications link 82, for example, a high-speed parallel (e.g., the known type SCSI) or serial data link. The sensed exhaust gases from the exhaust probe 21 pass through a hose 83 to the CEA 20. The CEA-processed signals are then presented to the CIU on a communications link 84, e.g., an RS232 serial data link.

The CIU directs the operation of the monitor 14, printer 15, and keyboard 16 through lines 86 (monitor lines 86*a*, keyboard lines 86*b*, and printer lines 86*c*). Communication with each device is in conformance with the appropriate industry standard for that particular type of device.

Figure 3:
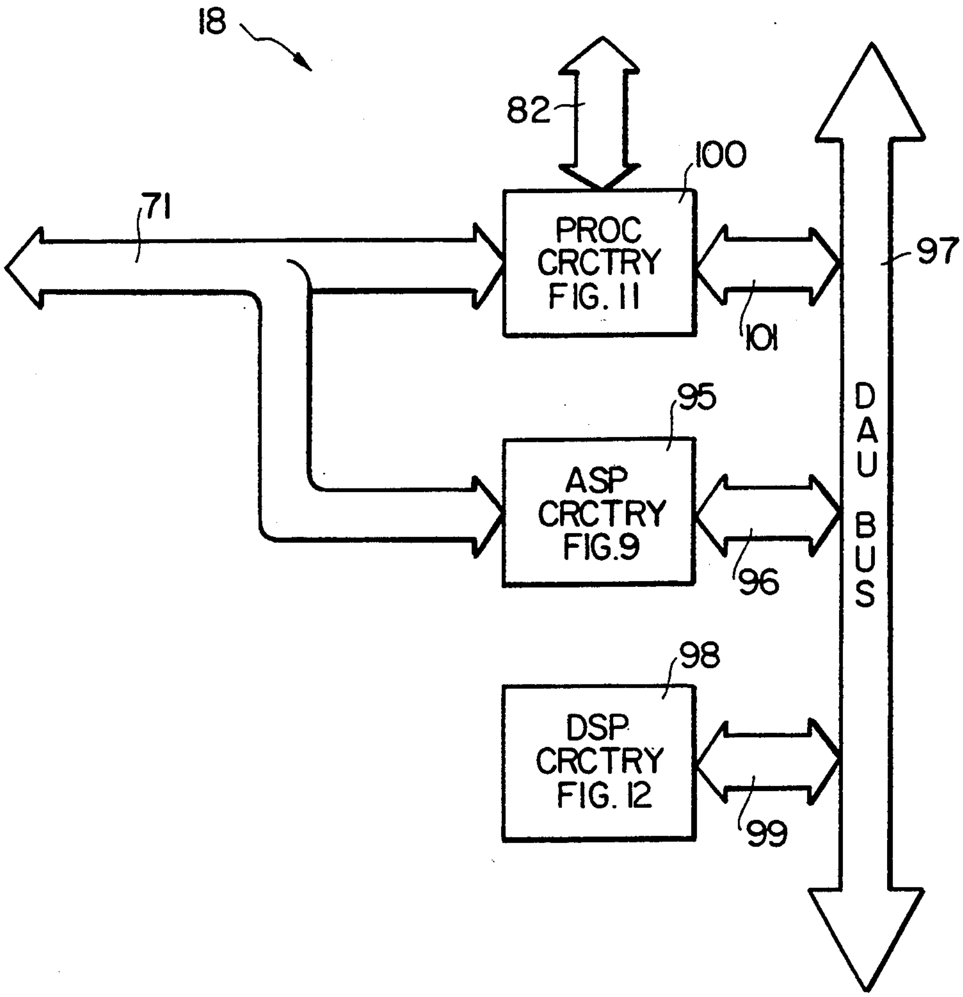
FIG. 3 is a block diagram of selected elements of the automotive diagnostic equipment of FIG. 2.

Referring to FIG. 3, the DAU 18 includes known type, analog signal processing (ASP) circuitry 95 which performs analog to digital conversion on the predominantly analog-type, sensed engine signals. The converted signals are further processed by other portions of the DAU and CIU. The ASP circuitry connects by signal lines 96 to a DAU system bus 97 comprising a known bus architecture, e.g., the Multibus standard. The ASP circuitry is described in more detail hereinafter with respect to FIG. 9.

The DAU also includes digital signal processing (DSP) circuitry 98 for data reduction and adaptive filtering. The DSP circuitry 98 connects by signal lines 99 to the DAU system bus and is described in more detail hereinafter with respect to FIG. 12 Also, the DAU contains processor circuitry 100 that processes signals for use by other portions of the equipment 10, including the ASP circuitry 95, DSP circuitry 98, boom 22 and the CIU 12. The processor circuitry 100 connects to the DAU system bus by signal lines 101 and is described in more detail hereinafter with respect to FIG. 11.

Figure 4:
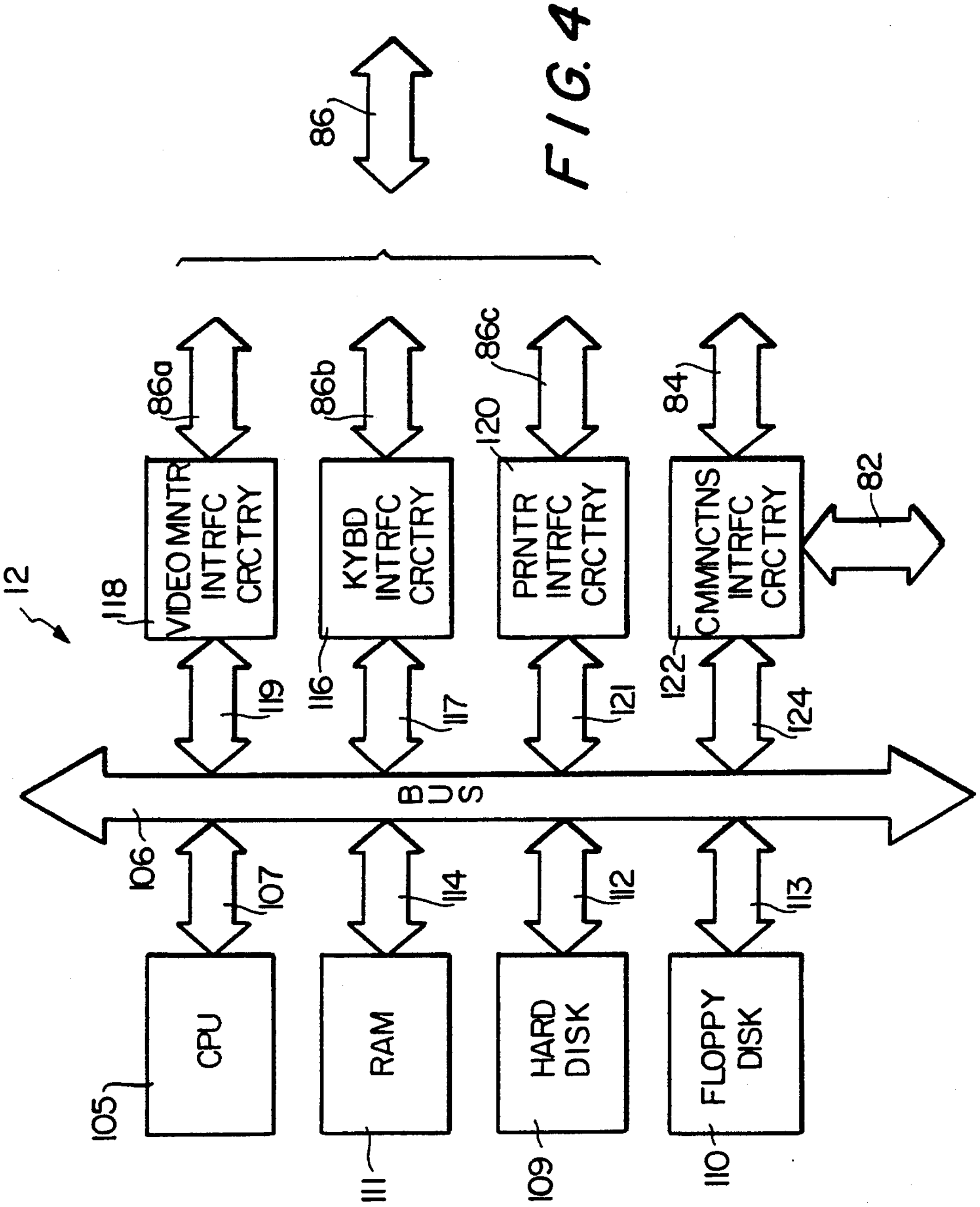
FIG. 4 is a block diagram of further selected elements of the automotive diagnostic equipment of FIG. 2.

Referring to FIG. 4, the CIU 12 comprises, e.g., an International Business Machines (IBM) Corporation Model AT computer. The CIU contains the hardware and software necessary to interface with all elements of the equipment 10. The CIU includes a central processing unit (CPU) 105 connected to a CIU bus 106 by signal lines 107. The CIU bus 106 includes address, data and control lines.

The CIU provides data storage devices, including a hard disk drive 109, one or more floppy disk drives 110, and random access memory (RAM) 111. The hard disk 109, typically 40 megabyte (MB) capacity, stores the known operating system (e.g., MS-DOS) and vehicle test software as well as the operating software for the DAU processor circuitry 100 and DSP circuitry 98. The hard disk connects to the CIU bus by signal lines 112.

The floppy disk 110 loads software on the hard disk and comprises the known 3.5 inch, 1.44 MB format. The floppy disk connects to the CIU bus by signal lines 113. The RAM 111 stores program operating parameters and comprises integrated circuit (IC) components totalling 640 kilobytes (KB) or more of memory capacity. The RAM connects to the CIU bus by signal lines 114.

The keyboard 16 is the primary user input device to the CIU and provides a full alphanumeric character set. The CIU includes keyboard interface circuitry 116 connected to the CIU bus by signal lines 117. The monitor 14, e.g., a Model 1019/SP from Microvitec Corp., displays vehicle test procedures and results. The CIU includes monitor interface circuitry 118 connected to the CIU bus by signal lines 119. The printer, e.g., a Model LQ-850 dot matrix printer from Epson Corp., prints vehicle test data and results. The CIU includes printer interface circuitry 120 connected to the CIU bus by signal lines 121.

The CIU also includes known communications interface circuitry 122 that implements the DAU link 82 and CEA link 84. The DAU link communicates engine signals from the DAU and software stored on the hard disk 109 to the DAU. The CEA link communicates CEA-processed exhaust signals. The communications interface circuitry 122 connects to the CIU bus by signal lines 124.

In a typical automobile diagnostic and repair procedure, the operator connects the desired engine probes 25–36 and/or exhaust probe 21 to the vehicle under test. The operator then determines vehicle performance by instructing the equipment to execute diagnostic tests. The particular tests chosen are selected from a menu displayed on the monitor. The equipment 10 also provides probe hookup information for each test. Test operation proceeds and the resulting test data is displayed on the monitor for interpretation. The operator can also print out a hard copy of the test results on the printer. The tests include:

cranking: cranking the engine and preventing start-up allows the starting and engine mechanical systems to be diagnosed. Test results are obtained by energizing the starter motor for fifteen seconds and inhibiting engine start-up through suppression of the primary ignition system.

relative compression: measures the starter current draw from the battery during each cylinder's compression stroke and compares each cylinder relative to one another.

charging: measures alternator voltage and amperes outputs during a ten-second period. The cranking test is normally performed just prior to this test so as to discharge the battery during the cranking period, thus creating full alternator output demand.

running: provides general diagnostic information at any engine speed. Information provided includes engine speed, battery voltage, battery current, dwell, vacuum and timing.

primary voltage: measures the induced voltage in the primary circuit at the beginning of secondary circuit discharge.

secondary ignition: measures spark plug firing voltage amplitude and duration.

dwell per cylinder: measures the pulse width in degrees of rotation of the dwell portion of the ignition signal in the primary ignition circuit.

cylinder balance: measures the power output of each cylinder by defeating the ignition of one cylinder at a time and measuring the RPM drop of the engine. The RPM drop of each cylinder is compared to one another to provide a relative indication of power balance.

fuel distribution: sequentially defeats each cylinder and measures the emissions change in order to verify that each cylinder is receiving approximately the same air/fuel mixture in the correct proportion, and also measures the power balance of each cylinder similar to the cylinder balance test.

RPM/vacuum: measures engine RPM and intake manifold vacuum when testing for catalytic converter restrictions or verifying proper air/fuel flow into the engine.

selective cylinder defeat: similar to the auto cylinder balance test; however, it allows selected cylinders or more than one cylinder at a time to be defeated. This test is used for carburetor balance testing.

battery load: measures engine RPM, battery voltage, and battery current while allowing the engine to crank, but not start, for twenty seconds. This test is designed to verify if the battery is capable of maintaining sufficient voltage under load in order to deliver sufficient current to the starter motor.

The equipment also provides digital scope capability for measurement and display of selected engine parameters in either real time or non-real time. Parameters include primary ignition, secondary ignition, and alternator ripple.

The description thus far is of equipment that aids an operator in the diagnosis and repair of automobiles. The present invention may be used in such equipment, as described in detail hereinafter. The use of the present invention in such equipment represents the best mode for carrying out the invention. However, it is to be understood that the invention may be implemented in simpler equipment which includes only the sensor means, signal processing means and display means required for direct support of the invention.

Figure 5A:
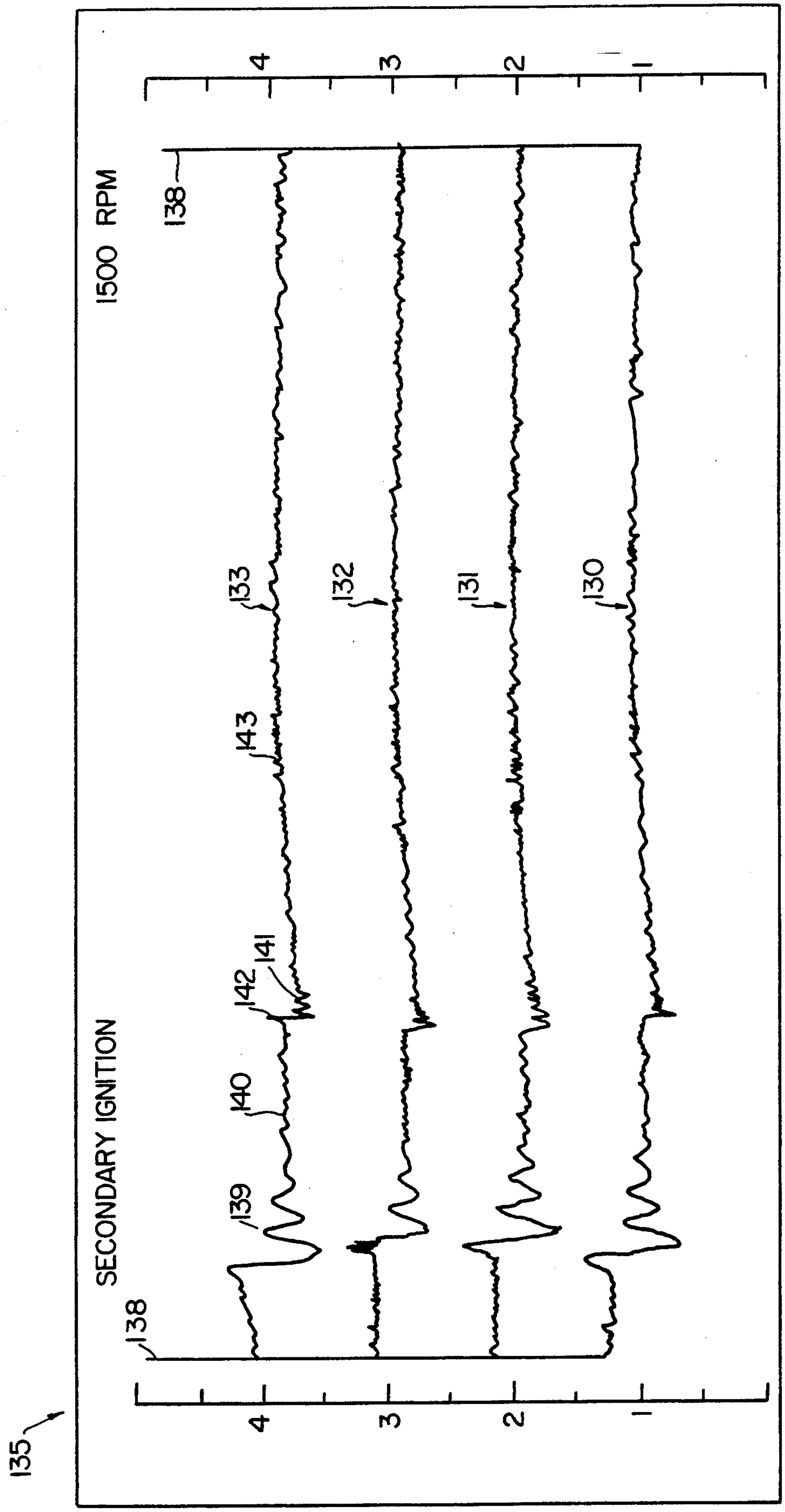
FIGS. 5(*a*) and 5(*b*) are screen displays of digitized automotive ignition signal waveforms as displayed in the automotive diagnostic equipment of FIG. 1.
Figure 5B:
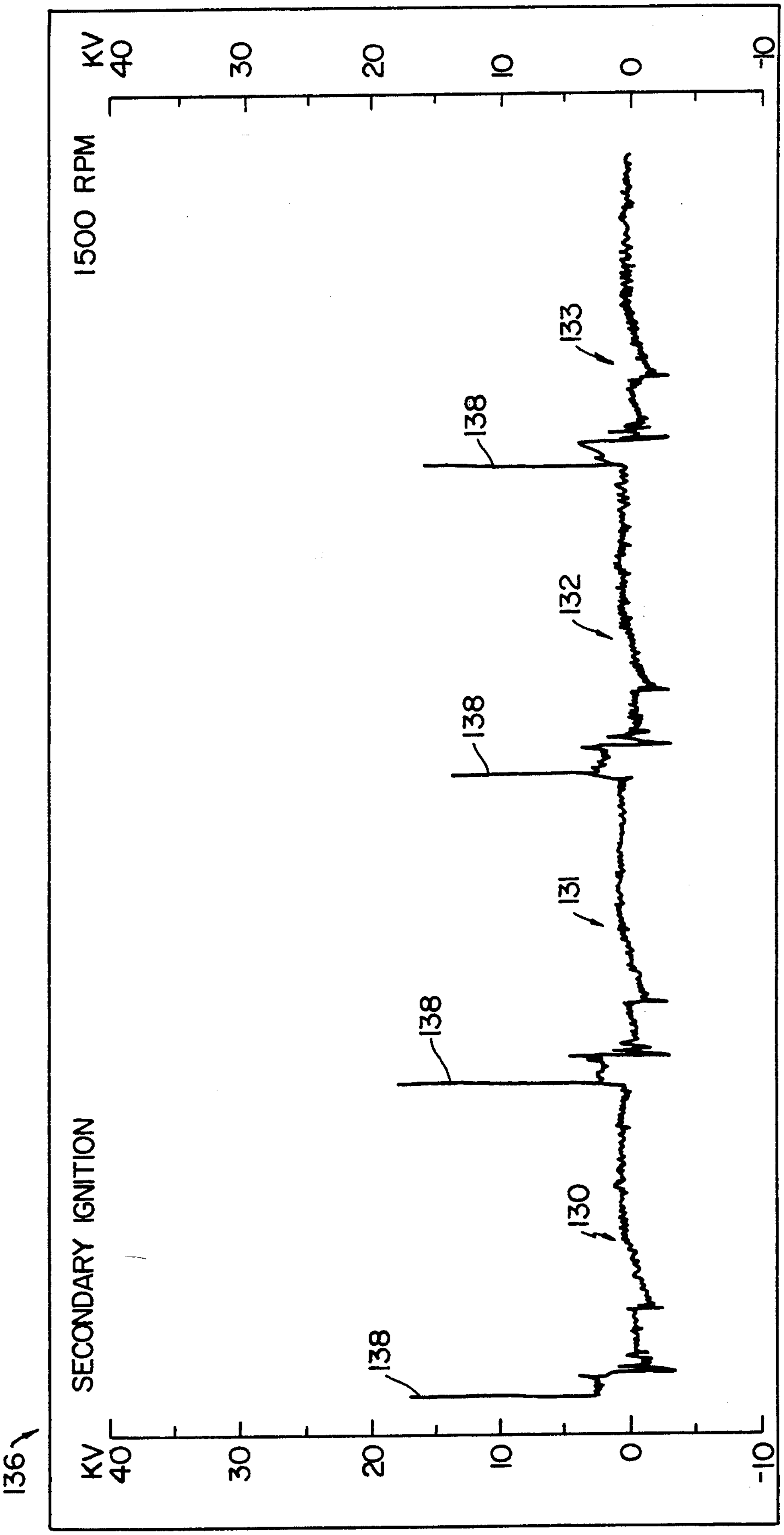

As part of a typical automobile diagnostic and repair procedure, the operator utilizes the digital scope function to display desired vehicle parameters on the monitor 14. FIG. 5, illustrations (a) and (b), illustrate exemplary secondary ignition voltage waveforms 130–133, as displayed on monitor display screens 135,136, each waveform corresponding to one cycle of ignition data for each cylinder of a four cylinder engine. FIG. 5, illustration (a), illustrates each secondary ignition voltage waveform 130–133 stacked on top of one another in the well known raster display format. FIG. 5, illustration (b), illustrates the waveforms 130–133 cascaded in the well known parade display format. The waveforms of FIG. 5 represent the secondary ignition voltage waveforms as measured by the appropriate engine probes 25–36 and digitized and displayed in accordance with the present invention.

Each waveform is illustrated, in traditional oscilloscope graphical display format as voltage amplitude versus time, starting from the high voltage spark peak 138, approaching 20 kilovolts (KV) in amplitude. A period of high frequency oscillation 139 follows, then steady state 140, high frequency oscillation 141 after dwell 142, and steady state 143 before returning to spark 138.

Figure 6:
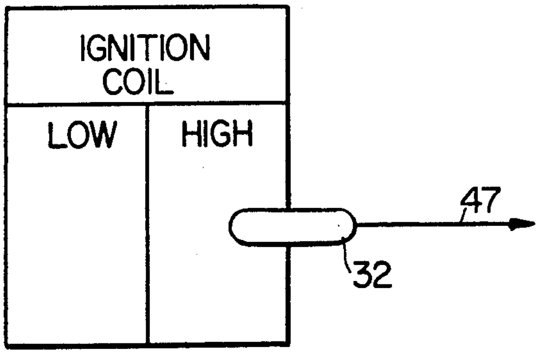
FIGS. 6,7 are illustrations of the connections of selected engine probes to a vehicle under test.

Referring again to FIG. 2, the operator connects the KV probe 32 to the secondary (high voltage) side of the vehicle ignition coil (FIG. 6). The sensed secondary ignition voltage signal is provided on the signal line 47 to the connector 62 in the boom 22. The sensed signal is then presented on one of the lines 69 to the signal conditioning circuitry 70, which presents the secondary ignition signal essentially unchanged on one of the lines 71 to the DAU 18.

Figure 7:
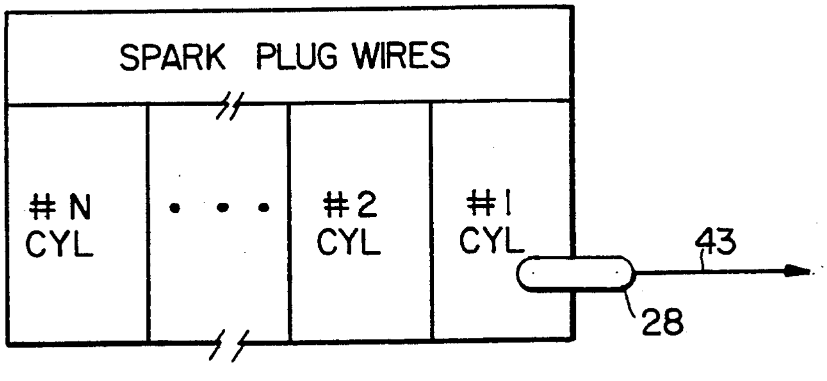
Figures 8A, 8B, 8C:
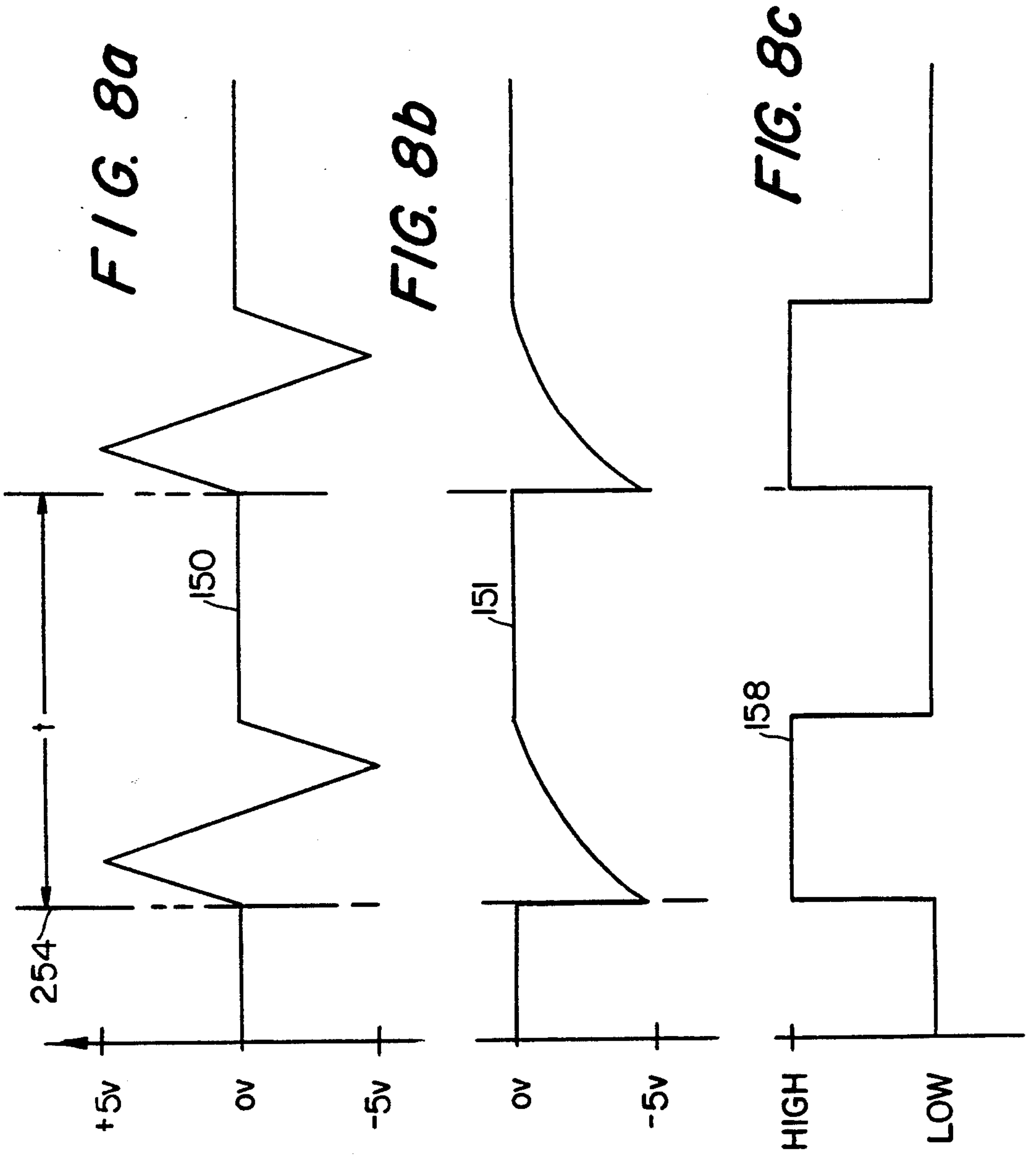
FIGS. 8(*a*), 8(*b*) and 8(*c*) illustrate exemplary ignition system waveforms as may be found in a vehicle under test, and corresponding signal waveforms found in the automotive diagnostic equipment of FIG. 2.

The operator also connects the inductive pickup probe 28 to the #1 cylinder spark plug ignition wire (FIG. 7). The probe 28 senses each #1 spark plug firing and presents this signal (waveform 150 of FIG. 8, illustration (a)) on the line 43 to the connector 58 in the boom 22. The signal conditioning circuitry 70 removes the positive voltage component of the signal using known rectification components (not shown) The conditioned #1 cylinder signal (waveform 151 of FIG. 8, illustration (b)) is presented on one of the lines 71 to the DAU 18.

Figure 9:
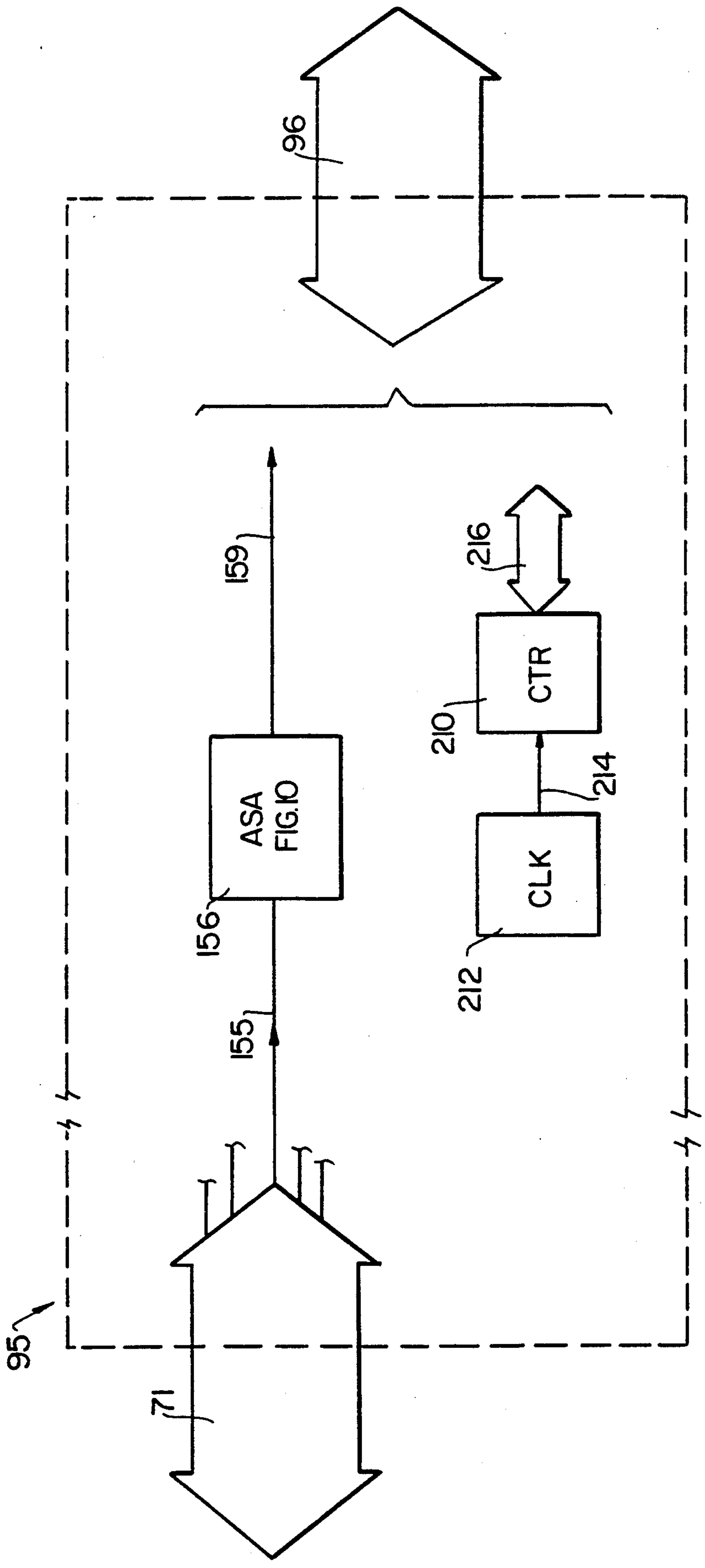
FIG. 9 is a detailed block diagram of a portion of the selected elements of FIG. 3.

FIG. 9 illustrates the DAU ASP circuitry 95 in greater detail The conditioned #1 cylinder signal is presented on a line 155 to a known type, adaptive sense amplifier 156 (ASA). The ASA 156 converts the conditioned #1 cylinder signal to a corresponding TTL voltage level signal (waveform 158 of FIG. 8, illustration (c)), and presents this signal on a line 159.

Figure 10:
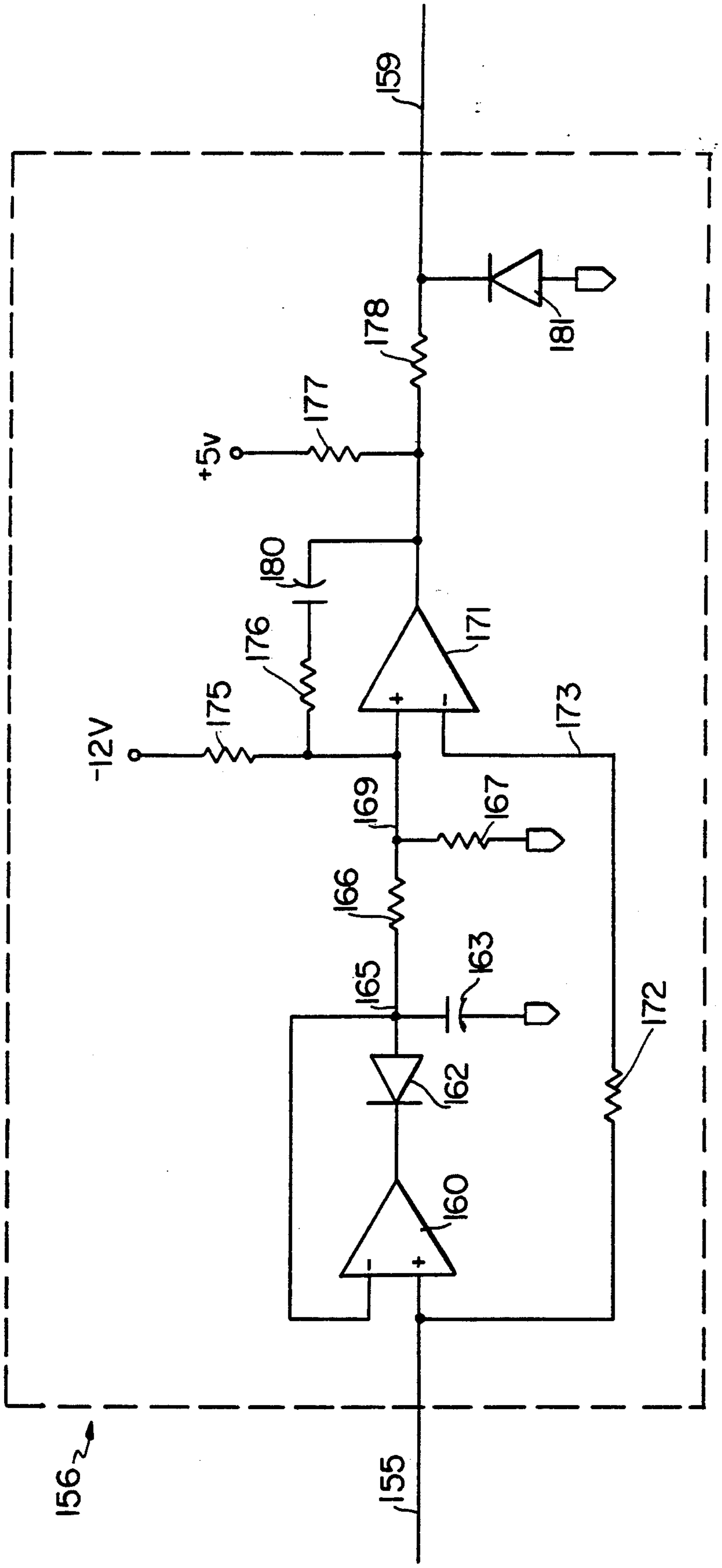
FIGS. 10 is a detailed block diagram of a portion of the selected elements of FIG. 9.

FIG. 10 is a detailed illustration of the ASA. The conditioned #1 cylinder signal on the line 155 is presented to an input of a known type, operational amplifier 160 (OP AMP). The OP AMP 160 together with diode 162 and capacitor 163 are arranged as a negative peak detector, providing a signal on a line 165 indicative of the peak negative DC voltage of the conditioned #1 cylinder signal. The peak signal is presented to a resistor divider network comprised of known type resistors 166,167, whose output is provided on a line 169 to a plus (+) input of a second OP AMP 171. The conditioned #1 cylinder signal is presented through a resistor 172 on a line 173 to a negative (−) input of the second OP AMP 171. The second OP AMP together with resistors 176–178, capacitor 180, and diode 181 are arranged to present a high TTL voltage signal on the ASA output line 159 whenever the plus input of the second OP AMP is at a higher DC voltage than the negative input. Conversely, a low TTL voltage signal is provided on the ASA output line 159 when the negative input is at a lower DC voltage than the plus input.

The ASA output on the line is high when the conditioned #1 cylinder signal at the ASA input is at a negative DC voltage value. The ASA output signal line connects to the DAU processor circuitry 100 through signal lines 96 and DAU system bus 97.

Figure 11:
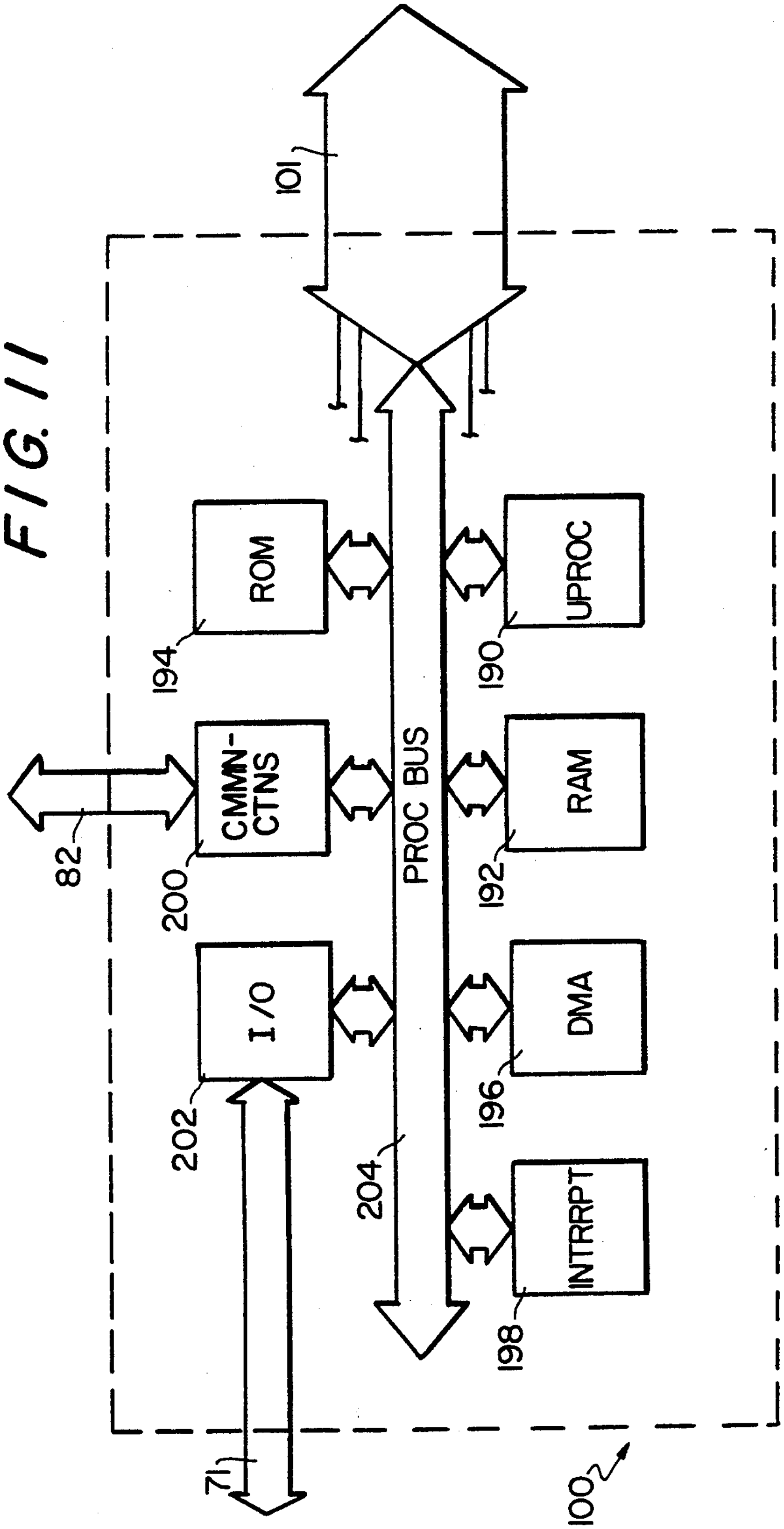
FIG. 11,12 are detailed block diagrams of portions of the selected elements of FIG. 3.

Referring to FIG. 11, the DAU processor circuitry 100 includes a known type microprocessor 190 (UPROC) (e.g., an Intel Corporation Model 80186) as the central processing unit. Also included are a number of UPROC support components, such as random access memory 192 (RAM), read only memory 194 (ROM) direct memory access 196 (DMA), interrupt controller 198 (INTRRPT), communications interface 200 (CMMNCTNS), and input/output interface 202 (I/0). These components communicate with each other and the signal lines 101 and DAU system bus 97 by a processor bus 204 comprising address, data and control lines.

The RAM 192 stores data operated on by the UPROC 190 and comprises known MOS-type ICs. The ROM 194 comprises nonvolatile storage for both program parameters and UPROC-executable software. The communications interface 200 implements the SCSI link 82 to the CIU 12. The I/0 interface 202 communicates data on the lines 71 to the boom 22. The DMA 196 transfers data, without UPROC intervention, from the DSP circuitry 98 to RAM 192, and from RAM to the CIU 12 over the SCSI link 82. The interrupt controller 198, typically an Intel Corporation Model 8259, determines the UPROC interrupt priority from among a number of signals connected to the interrupt controller inputs. The output of the interrupt controller 198 is connected to an interrupt input on the UPROC 190.

Referring also to FIG. 9 again, the ASA output signal on the line 159 connects to an input of the interrupt controller 198, which interrupts normal UPROC program operation each time the inductive pickup probe 28 senses a firing of the #1 cylinder spark plug. Upon occurrence of a #1 cylinder interrupt, the UPROC 190 computes engine speed in RPM, as described in more detail hereinafter.

The ASP circuitry 95 also contains a counter 210 (CTR), typically an Intel Corporation Model 8254, and a clock 212 (CLK) that provides 35 KHZ pulses on a line 214 to a CTR input. The CTR 210 contains two internal registers that, when triggered, count the 35 KHZ input pulses. The CTR communicates with the DAU processor circuitry 100 through signal lines 216 connected to the DAU system bus. The UPROC 190 transmits data words to the CTR to start and stop the counting of the 35 KHZ pulses.

Figure 12:
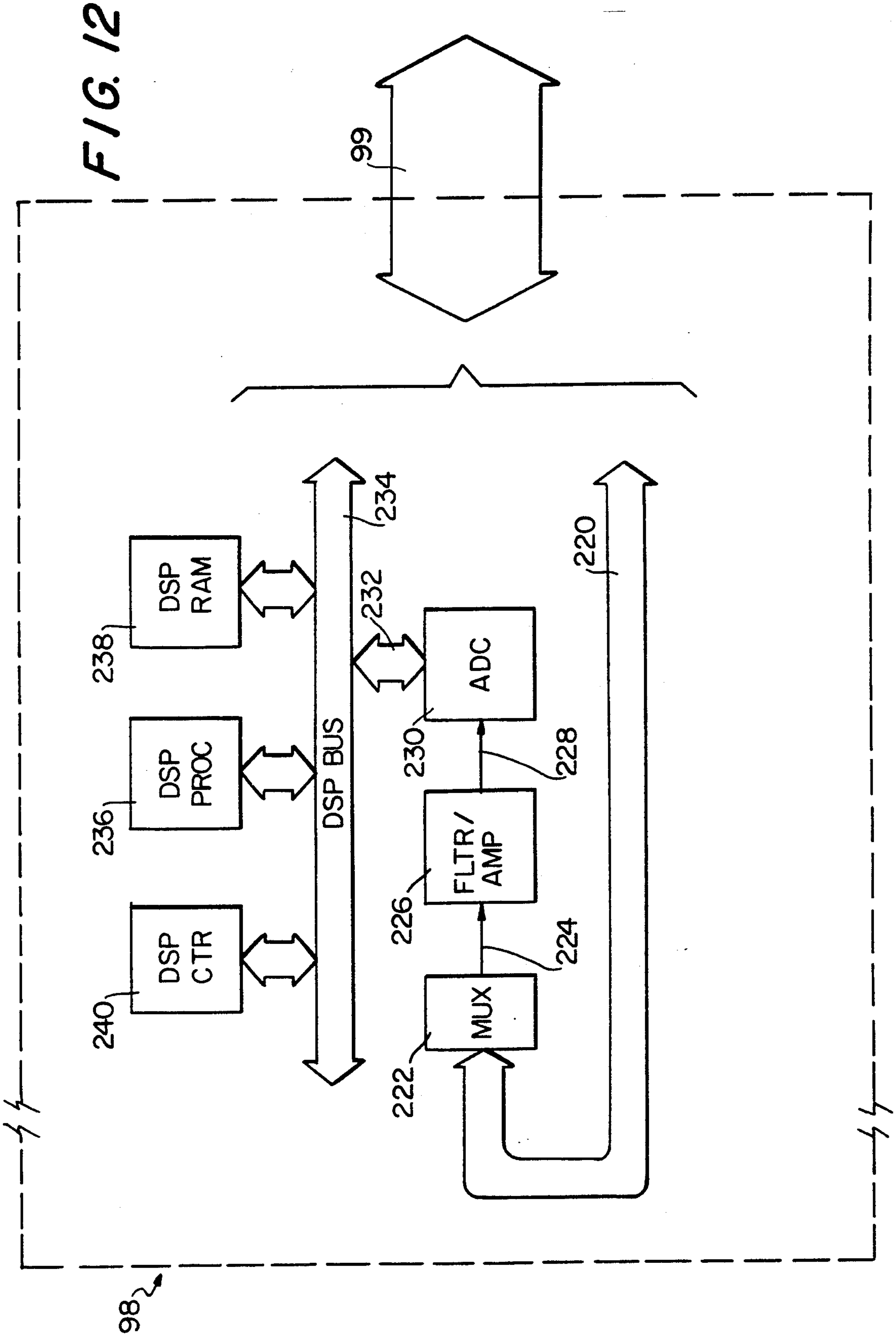

FIG. 12 illustrates the DAU DSP circuitry 98 in greater detail. The sensed engine signals from the boom 22 on the lines 71 enter the DAU 18 at the ASP circuitry 95 where they are signal conditioned. Several of the conditioned signals are fed to the DSP circuitry 98, then presented on signal lines 220 to a known type multiplexer 222 (MUX), e.g., a Harris Corporation Model HI506A. The MUX 222 presents the selected signal on a line 224 to a known type, filter/amplifier 226 arrangement, whose output on a line 228 is fed to a known, flash-type analog to digital converter 230 (ADC), e.g. a Datel Corporation Model ADC304. The ADC 230 samples the conditioned engine signals at a high frequency and presents its output on signal lines 232 to a DSP system bus 234, typically comprising address, data, and control lines.

Also connected to the DSP bus 234 is a known digital signal processing microprocessor 236 (DSP PROC), e.g., a Texas Instruments Model TMS320C25. The DSP PROC 236 reads the ADC periodically and processes the samples in accordance with the present invention for subsequent display. Random access memory 238 (DSP RAM) stores both software executable by the DSP PROC and ignition signal samples. The DSP RAM 238 typically includes 80 KB of memory capacity, and comprises both Fujitsu Corporation Model MB81C78A-35P and MB84256-10 components. A known type counter 240 (CTR), e.g., Intel Corporation Model 8254, interrupts the DSP PROC at programmable time intervals, in response to which the DSP PROC reads the ADC count value.

The operation of the equipment 10 in implementing the digital scope function, and, in particular, the digitization and display of certain automotive ignition signals in accordance with the present invention, is best understood by example. The operator selects the digital scope function from a menu of equipment functions displayed on the monitor 14. The operator then connects the KV probe 32 and inductive pickup probe 28 to the engine in the manner described hereinbefore with respect to FIGS. 6,7, and runs the engine at a certain RPM.

Figure 13:
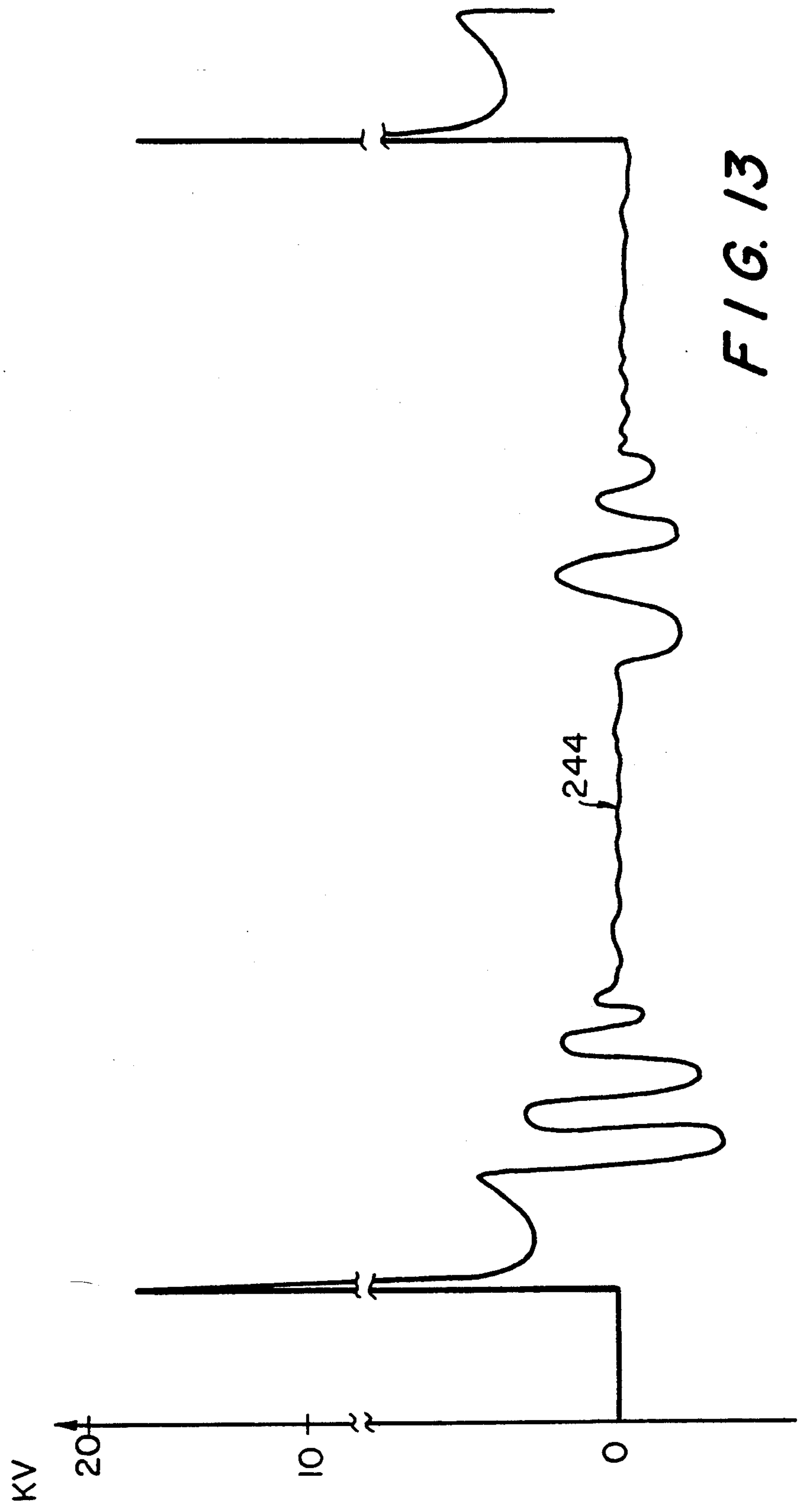
FIG. 13 illustrates an exemplary ignition system waveform as may be found in a vehicle under test.
Figures 14A, 14B, 14C:
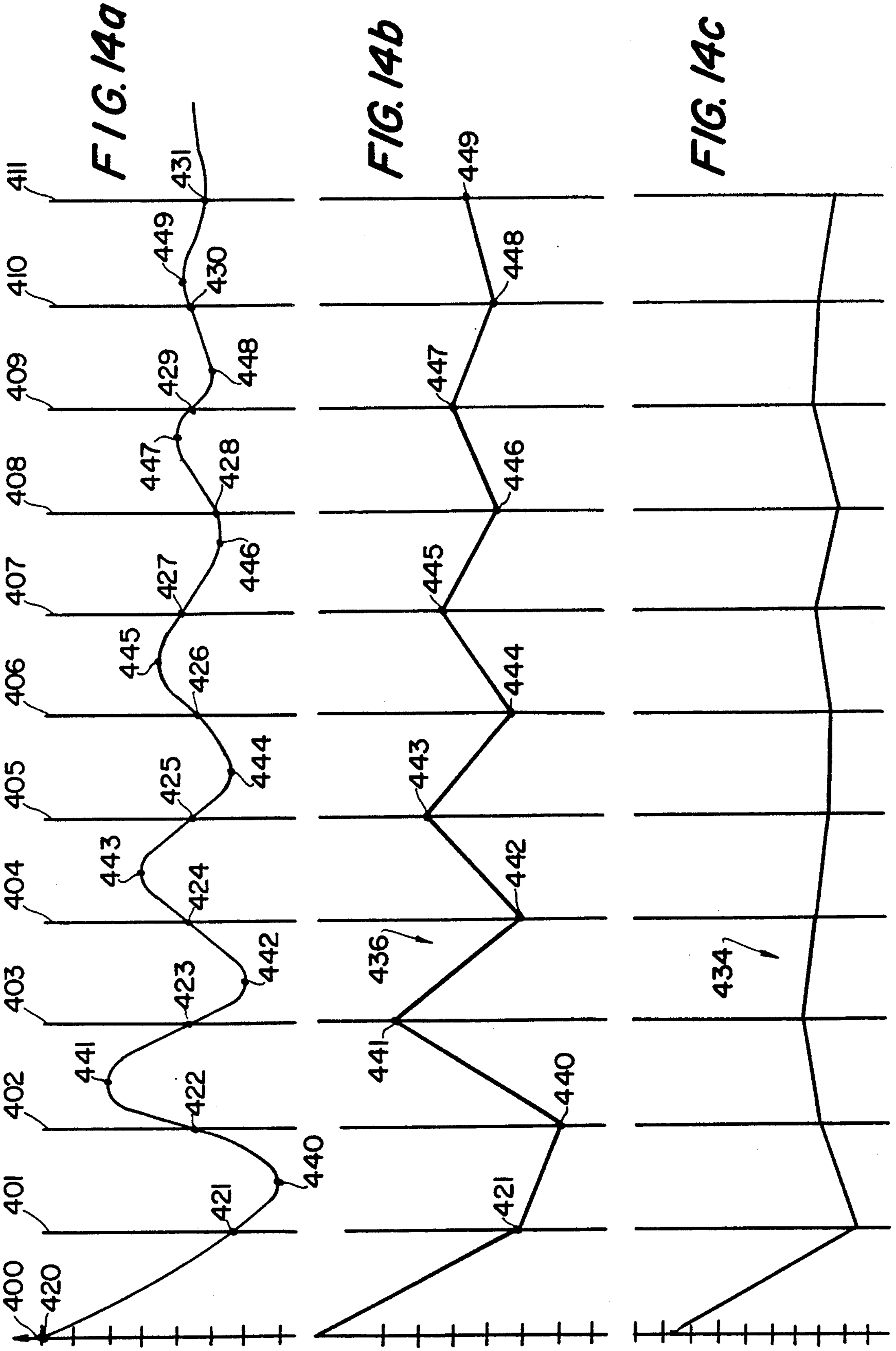
FIGS. 14(*a*), 14(*b*) and 14(*c*) illustrate a portion of the exemplary ignition system waveform of FIG. 13, and corresponding digitized versions thereof.

The KV probe 32 senses the ignition voltage signal on the secondary side of the vehicle ignition coil. The sensed signal is presented to the ADC for sampling, the samples being read by the DSP PROC at predetermined time intervals. FIG. 13 illustrates a representative sensed secondary ignition signal waveform 244 presented to the ADC, while FIG. 14, illustration (a), illustrates a portion of the ignition waveform 244 containing high frequency oscillations following spark peak voltage.

The monitor displays information in a raster format in which the electron beam is turned on and off in individual picture elements (pixels) as the beam scans from left to right across the display screen. Once across, the beam is turned off and retraced back to the left side of the screen, but to a vertical position below that of the previous scan line. The line scanning repeats until the entire screen has been scanned. The overall screen scanning is performed at a high rate of speed so that the individual screens appear continuous to the human eye.

The horizontal resolution of the monitor is the number of pixels per line, typically 640 pixels. However, in FIG. 5, illustrations (a) and (b), 512 pixels, centered in the screen, display the secondary voltage waveform, while the remaining pixels display other information such as the vertical axes. Thus, in FIG. 5, illustration (a), one cycle of the secondary ignition voltage signal is constrained to reside in an area fixed at 512 pixels wide, each pixel equally spaced in time. This constraint poses problems in accurately digitizing a signal having varying frequency content (e.g., one cycle of the ignition signal) within the desired display format.

With RPM known, the time intervals at which the DSP PROC may read the ADC is the cylinder period divided by the fixed number (512) of data points. The inverse of this interval is the effective sample rate (ESR). The ESR, however, cannot be used to sample the ignition signal since the signal oscillation frequency after spark or dwell (FIGS. 13,14) may be greater than the ESR, and, thus, the high frequency oscillation would not be accurately digitized. Therefore, the ignition signal must be sampled faster than the ESR.

Capturing the signal high frequency oscillation is only part of the overall digitization task achieved by the apparatus of the present invention. The apparatus also detects and captures the high amplitude, short duration peak spark voltage.

In digital scope operation, software stored on the CIU hard disk 109 (FIG. 4) is transferred over the DAU link 82 to the DAU processor circuitry 100 (FIG. 3), and is then stored in the DSP RAM 238 (FIG. 12). The software, executed by the DSP PROC 236, comprises algorithmic subroutines for digitization of an automotive signal in accordance with the present invention.

Figure 15:
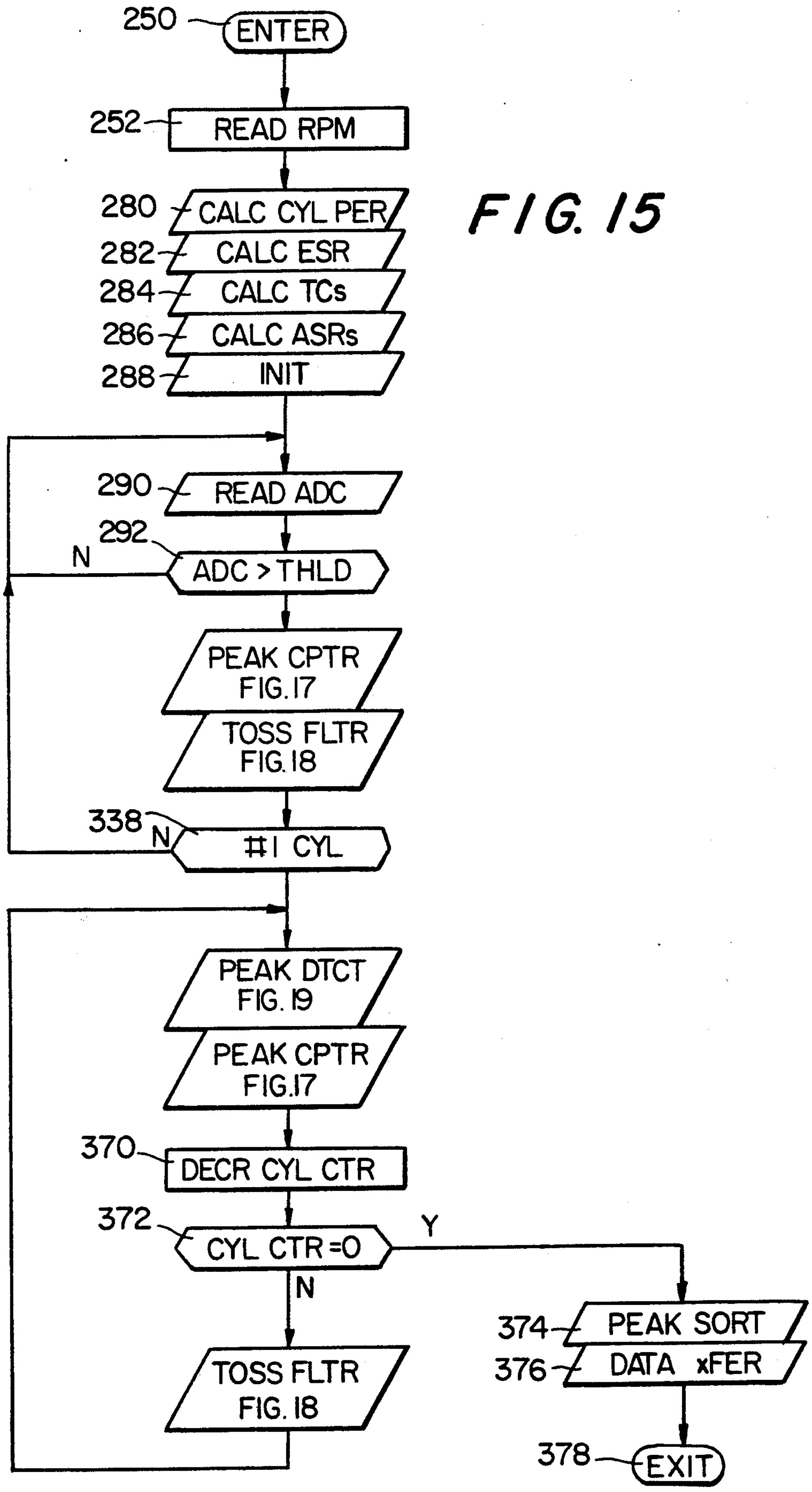

After an enter step 250 in the main subroutine of FIG. 15, the DSP PROC reads, in a step 252, the current engine RPM stored in DSP RAM. The UPROC 190 on the DAU processor circuitry 100 (FIG. 11) calculates the RPM in the subroutine of FIG. 16.

Referring again to FIGS. 2,8,9, the inductive pickup probe 28 senses the firing of the #1 cylinder spark plug (FIG. 8, illustration (a)). The conditioned #1 cylinder signal (FIG. 8, illustration (b)) is fed to the ASA 156, whose output (FIG. 8, illustration (c)) on the line 159 goes high at time 254 (FIG. 8) interrupting the UPROC 190, which then executes the subroutine of FIG. 16.

Figure 16:
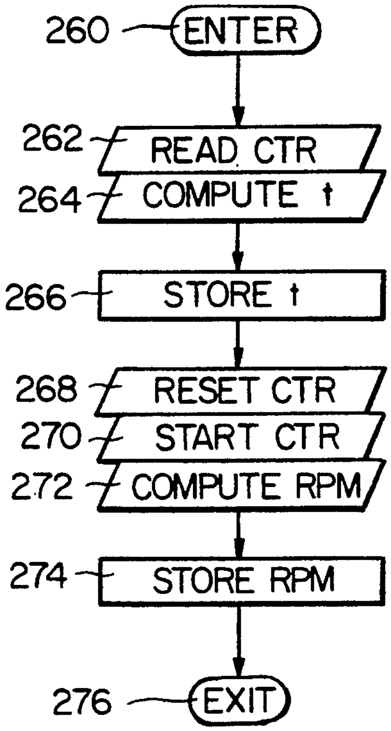

After an enter step 260 in FIG. 16, the UPROC reads, in a routine 262, a CTR 210 register containing the number of 35 KHZ pulses since the prior #1 cylinder interrupt. The UPROC calculates, in a routine 264, the time since the last #1 cylinder interrupt by multiplying the number of pulses in the CTR register by the time period of a 35 KHZ pulse. In a step 266, the UPROC stores this time in DAU processor RAM 192 as time "t". The UPROC resets the CTR 210 in a routine 268, and starts the CTR counting the 35 KHZ pulses again in a routine 270. The time "t" is used to calculate, in a routine 272, the engine RPM for a four cylinder engine using the following equation:

RPM=(1/t) * 2 (revs per #1 cyl) * 60 (sec per min)

In a step 274, the UPROC stores the RPM value in both DAU processor RAM 192 and in DSP RAM 238, and the subroutine exits in a step 276.

Returning to FIG. 15, after reading the current value of engine RPM in the step 252, the cylinder period is calculated, in a routine 280, using the following equation:

CYL PER=120/(RPM * # of CYLS)

Thus, assuming a current RPM of 1500 and a four cylinder engine, the calculated cylinder period is 20,000 microseconds. The inverse of the ESR (i.e., the time period between samples at the ESR) is calculated in a routine 282 using the following equation:

ESR PERIOD=CYL PER/# OF FIXED DATA POINTS

With 512 fixed data points, the ESR PERIOD equals 39 microseconds per sample. The DSP PROC next calculates, in a routine 284, a separate toss count, TC, for the toss filter subroutine of FIG. 18 and the peak detect subroutine of FIG. 19, using the following equation:

TC=INTEGER(ESR PERIOD/WORST CASE FILTER TIME)

The worst case filter time for each subroutine is described in detail hereinafter; it suffices for the moment that its approximate value for the toss filter subroutine is 6 microseconds, and 3 microseconds for the peak detect subroutine. Thus, for an ESR PERIOD of 39 microseconds, the toss filter TC equals 6, while the peak detect TC equals 13.

The DSP PROC calculates, in a routine 286, the actual sample rate time intervals, ASR, at which the DSP PROC samples the ADC in both the toss filter subroutine and peak detect subroutine, using the following equation:

ASR=ESR PERIOD/TC

Thus, the toss filter ASR equals 6.5 microseconds, while the peak detect ASR equals 3 microseconds.

Next, a routine 288 is executed in which a location in DSP RAM 238 is set to the number of engine cylinders. The ADC 230 is read in a routine 290 and the ADC value is checked, in a test 292, for exceedence of a predetermined threshold value (e.g., 10 KV), stored in DSP RAM. If no exceedence, the subroutine branches back to the read ADC routine 290. Upon exceedence, the peak capture subroutine of FIG. 17 is executed. Threshold exceedence is an indication that the ignition signal is approaching the spark peak.

After an enter step 294 in FIG. 17, a loop counter in DSP RAM is initialized, in a step 296, to a predetermined value. The peak portion of ignition spark is of short duration, e.g., 15–25 microseconds. To insure peak spark capture, the DSP PROC reads the ADC as fast as possible and as many time as possible for a predetermined 80 microsecond time period. The loop begins with the step where the ADC is read in a routine 298, then the ADC count is stored in DSP RAM in a step 300, the loop counter is decremented in a step 302, and the loop counter is checked, in a test 304, for zero. From the manufacturer's product literature on the ADC, DSP RAM and DSP PROC, the execution time of the loop is determined, from which the loop counter initial value in step 306 is determined so that the loop gets continually executed for 80 microseconds. The rate at which the DSP PROC samples the ADC is thus comprised of the execution time of the loop.

To insure peak spark capture, as little signal processing as possible is performed in the loop. However, the ADC values stored in the step 300 still must be sorted to determine the peak value. This sorting is performed in the main subroutine, as described hereinafter, when DSP PROC sampling time of the ADC is not critical. The peak capture subroutine then exits in a step 306, and, per the main subroutine of FIG. 15, the toss filter subroutine of FIG. 18 is entered.

Figure 18:
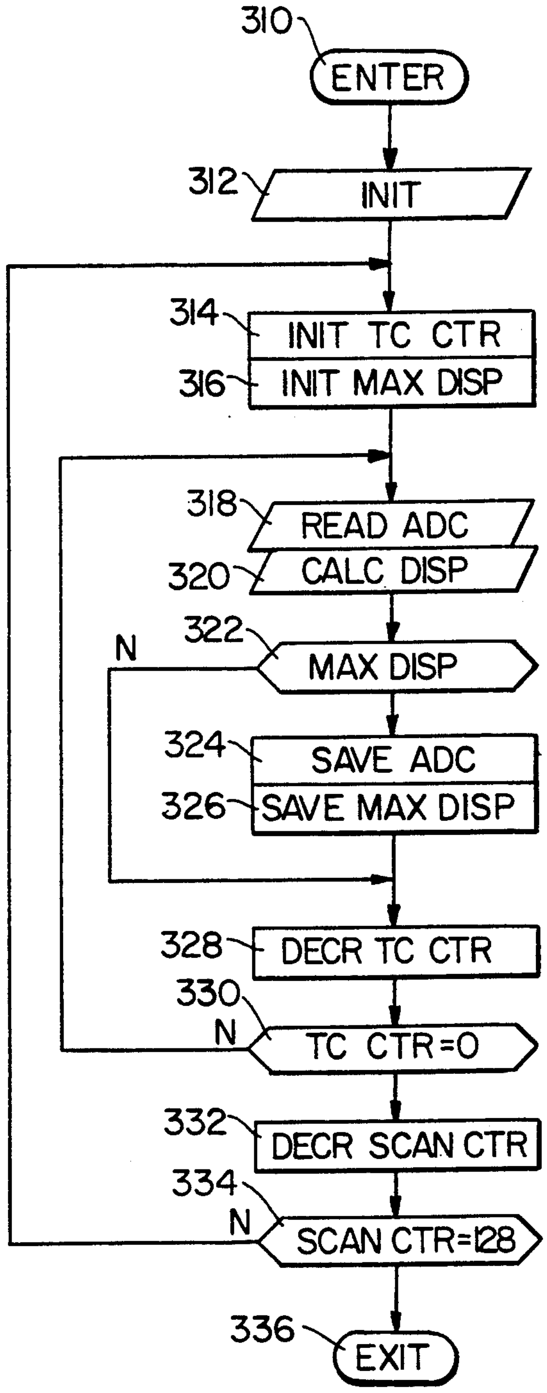

After an enter step 310 in FIG. 18, an initialization routine 312 is executed wherein a scan counter in DSP RAM is initialized to the fixed number (512) of displayed data points per line on the monitor 14, an ADC count location in DSP RAM is initialized to the maximum ADC count value, and the DSP CTR 240 is initialized to wait the toss filter ASR time (6.5 microseconds, as calculated in the routine 286 in the main subroutine) before interrupting the DSP PROC. Next, a counter (TC CTR) in DSP RAM is set to the toss count (e.g., 6) in a step 314, and a maximum displacement location in DSP RAM is initialized, in a step 316, to zero.

The ADC is read in a routine 318 and the current displacement is calculated, in a routine 320, by taking the absolute value of the result of subtracting the current ADC value from the previous ADC value stored in the ADC count location (initially set to a maximum ADC count value in the routine 312). This calculated displacement value is then compared for exceedence, in a test 322, to that stored in the step 316 (initially zero). Upon exceedence, the ADC value is stored in the ADC count location in DSP RAM in a step 324 and the new maximum displacement value is stored, in a step 326, in the maximum displacement location in DSP RAM. The TC CTR is then decremented in a step 328. If no exceedence, the subroutine branches directly to the decrement TC CTR step 328.

Next, the TC CTR is checked, in a test 330, for a value of zero. If not zero, the subroutine branches back to the read ADC routine 318. If the TC CTR is zero, the scan counter is decremented in a step 332 and checked, in a test 332, for a value of 128, which represents a 75 percent decrement of the 512 fixed data points. It is to be understood that 75 percent is exemplary and is derived from the fact that after 75 percent of one cycle of an ignition signal following spark peak, the ignition signal will be at steady state awaiting the next spark peak. If the scan counter is greater than 128, the subroutine branches to the step 314. If the scan counter equals 128, the toss filter subroutine exits in a step 336, and reenters the main subroutine of FIG. 15.

Each time the read ADC routine 318 is encountered, the DSP PROC 236 waits until the DSP CTR 240 interrupts the DSP PROC before reading the ADC. The interrupt occurs at the end of the ASR time period (6.5 microseconds) programmed into the DSR CTR in the initialization routine 312. This interrupt scheme insures that the ADC is sampled at fixed intervals.

The worst case filter time (e.g., 6 microseconds) of the toss filter subroutine is the overall time it takes the DSP PROC to execute the DSP PROC instruction path comprising steps 314–334. This time can be derived either from the manufacturer's specifications for the DSP PROC, ADC and DSP RAM, or can be measured with a logic analyzer. The worst case filter time is used in the calculate ESR routine 282 of the main subroutine.

One can see from the toss filter subroutine that the ADC is sampled by the DSP PROC at predetermined time intervals set by the ASR which occur at a rate faster than the ESR. However, only one sample is stored for later display, that sample being the one with the greatest absolute displacement from the one stored in the previous ESR PERIOD, while the remaining samples are 'tossed'.

Also, the processing of the ADC samples read in the routine 318 is performed in real time, i.e., it is done immediately after the ADC is read. However, in keeping with the present invention, the process of filtering through the ADC data for the maximum displacement point may be performed in non-real time, i.e., after several samples are stored, in a suitable method that should be apparent to those skilled in the art.

Returning to FIG. 15, a test 338 checks if the cycle of the ignition signal just digitized by the peak capture and toss filter subroutines is that of the #1 cylinder. Indication of the #1 cylinder to the DSP PROC may be derived from the #1 cylinder interrupt to the UPROC 190, as described hereinbefore with respect to calculation of RPM. If the cycle is not that of the #1 cylinder, the main subroutine returns to the read ADC routine 290 in order to await the next occurrence of spark peak. If it is the #1 cylinder, the peak detect subroutine of FIG. 19 is executed.

Figure 19:
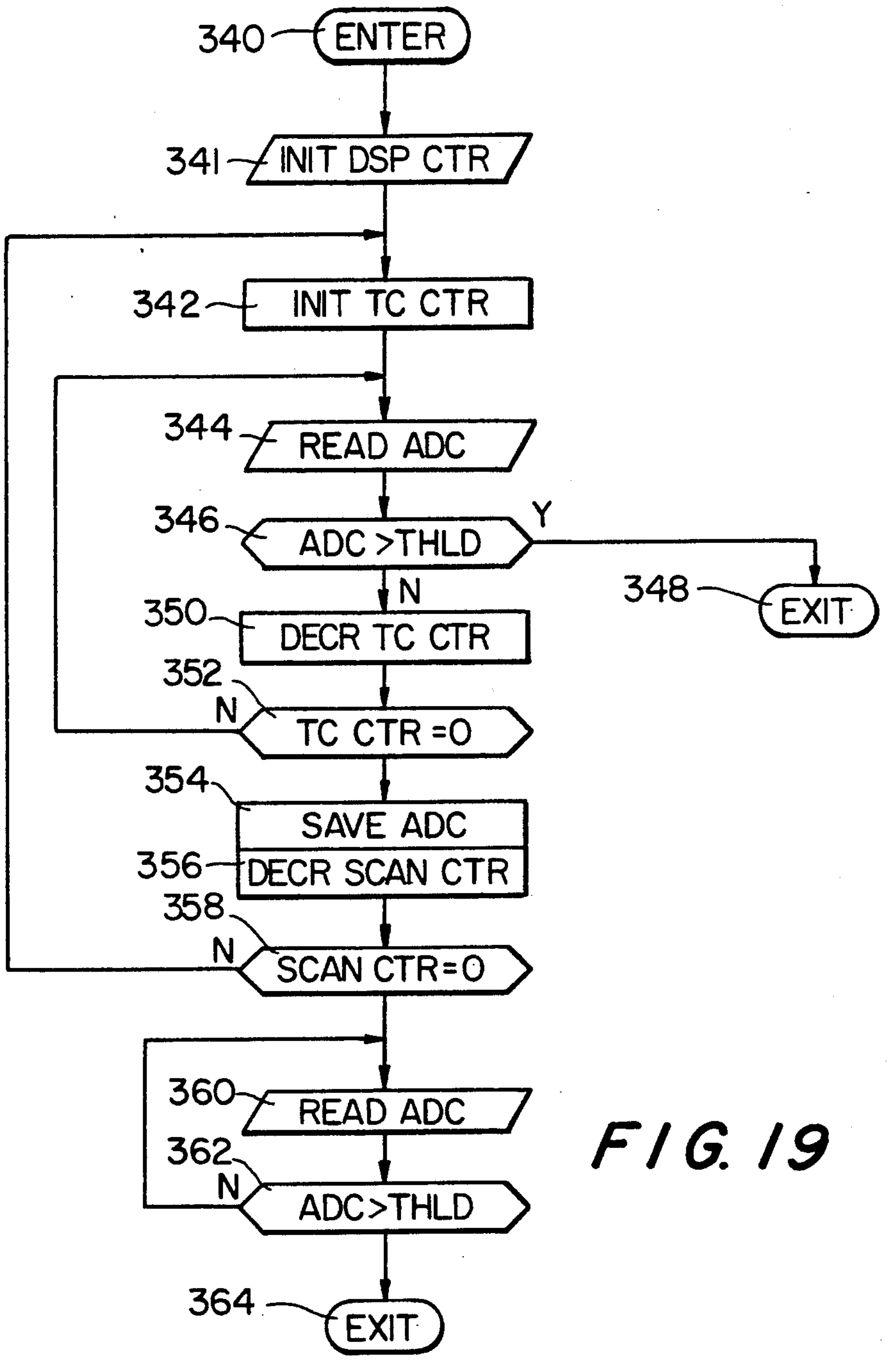

After an enter step 340 in FIG. 19, the DSP CTR 240 is initialized to wait the peak detect ASR time (3 microseconds, as calculated in the routine 286 in the main subroutine) before interrupting the DSP PROC. Next, the TC CTR is initialized, in a step 342, to the TC value (e.g., 13) calculated in the routine 284 in the main subroutine. The ADC is read, in a routine 344, and compared, in a test 346, to the predetermined threshold value for exceedence. Upon exceedence, the subroutine exits in a step 348. If no exceedence, the TC CTR is decremented, in a step 350, and checked, in a test 352, for zero. If not zero, the subroutine branches to the read ADC routine 344. If zero, the last ADC value read in the routine 344 is stored in DSP RAM in a step 354.

Next, the scan counter of the toss filter subroutine is decremented in a step 356 and checked for zero in a test 358. If not zero, the subroutine branches to the initialize TC CTR step 342. If zero, it is an indication that the entire 512 data points are digitized, yet the ignition signal cycle is not complete (i.e., still awaiting the next spark occurrence). While awaiting spark, the ADC is read in a routine 360 and the ADC value is compared, in a test 362, to the predetermined threshold for exceedence. If no exceedence, the subroutine branches to the read ADC routine 360. Upon exceedence, the subroutine exits in a step 364, and, per the main subroutine of FIG. 15, the peak capture subroutine of FIG. 17 is executed.

Each time the read ADC routine 344 is encountered, the DSP PROC waits until the DSP CTR 240 interrupts the DSP PROC before reading the ADC. The interrupt occurs at the end of the ASR time period (3 microseconds).

The worst case filter time (3 microseconds) of the peak detect subroutine is the overall time it takes the DSP PROC to execute the DSP PROC instruction path comprising steps 342–358 (excluding step 348). The worst case filter time is used in the calculate ESR routine 282 of the main subroutine.

In FIG. 15, upon return from the peak capture subroutine, the cylinder counter is decremented in a step 370, and the cylinder counter is checked, in a test 372, for zero. If not zero, the toss filter subroutine of FIG. 18 is executed, following which the peak detect and peak capture subroutines are executed, all three subroutines being executed in a loop until all cylinders have been digitized.

If the cylinder counter is zero, it is an indication that all cylinders have been digitized. A peak sort routine 374 is executed wherein the ADC values stored in DSP RAM in the step 300 of the peak capture subroutine of FIG. 16 are sorted to find the peak spark value, which is stored in DSP RAM. The peak sort is performed at this point in the digitization process so as not to detract from the speed at which the DSP PROC reads the ADC in the toss filter, peak detect, and peak capture subroutines.

Next, a routine 376 is executed where the stored sorted peak, together with the stored ADC values in the step 324 of the toss filter subroutine and any ADC values stored in the step 354 of the peak detect subroutine of FIG. 19, are transferred from DSP RAM to the RAM 192 on the DSP processor circuitry 100, and then to the CIU 12 over the DAU link 82 for subsequent display on the video monitor 14 in accordance with, e.g, FIG. 5. The aforementioned stored data represents a sufficient amount of data to accurately represent the sensed ignition signal in accordance with the present invention. The main subroutine then exits in a step 378.

Although not illustrated in FIG. 15 and forming no part of the present invention, a routine may be executed following the peak sort routine where the aforementioned stored data is passed through a toss filter subroutine, similar to FIG. 18, in which the data is further condensed before being displayed. This additional routine may be executed when it is desired to display multiple cycles of ignition data (e.g., in the parade display format of FIG. 5, illustration (b)) within the constraints of 512 data points per display line on the monitor 14.

FIG. 14, illustration (a), illustrates a portion of the high frequency oscillation following the spark peak of the waveform of FIG. 13. Vertical lines 400–411 indicate the spacing of the ESR time intervals and, thus, the timing of the fixed data points on the display screen. If the DSP PROC samples the ADC at the ESR, the resulting sample points are indicated by points 420–431 in FIG. 14, illustration (a). FIG. 14, illustration (c), illustrates the resulting waveform 434 digitized at the ESR. From this, it can be seen that the high frequency oscillation has been lost due to the relatively slow ESR sample rate of 39 microseconds per sample.

However, if the DSP PROC samples the ADC 230 at the ASR of 6.5 microseconds per sample (TC=6), the high frequency oscillations are more accurately captured, as evidenced by waveform 436 FIG. 14, illustration (b). Assume point 420 at time 400 in FIG. 14, illustration (a) corresponds to the spark peak. During time frame 400–401, the point with the greatest absolute displacement from that at time 420 occurs at time 421; thus, this point gets stored in DSP RAM in the step 324 in the toss filter subroutine and ultimately displayed on the exemplary display screens of FIG. 5.

Between times 401–402, the greatest absolute displacement is at point 440, which occurs midway between times 401–402. FIG. 14, illustration (b), illustrates the greatest displacement point 440 as displayed on the display screen at time 402. The greatest displacement points 441–450 corresponding to times 403–411 are obtained in a similar manner. The resulting digitized display for the overall secondary ignition signal waveform is illustrated in FIG. 5, illustrations (a) and (b).

It should be apparent to one skilled in the art that the peak detect and peak capture subroutines are used primarily for an automotive ignition signal where spark peak occurrence is predictable and desired to be captured for diagnostic purposes. It follows that for use with other signals (e.g., alternator diode/stator waveform) where there is no concern to detect and capture a peak voltage, if any, then it suffices that the digitizing apparatus of the present invention primarily execute the toss filter subroutine of FIG. 18 in digitizing these other signals.

As illustrated, the method for determining RPM is only exemplary and forms no part of the present invention; any known method may be used to determine RPM. It suffices that engine speed be available as part of the toss filter calculations.

Also, the ignition signal samples taken in the peak capture subroutine are sorted in the main subroutine. This is so because it is desired, in the peak capture subroutine, for the DSP PROC to be sampling the ADC as fast as possible. If the samples were sorted through in the peak capture subroutine, then the DSP PROC sampling frequency would be desirably decreased. However, the peak sort routine does not have to occur in the main subroutine; it suffices that the peak sort routine be executed at a point in the digitization process where the time spent in doing so does not detract from the sampling time of the DSP PROC.

Although the invention has been illustrated and described with respect to exemplary embodiments thereof, it should be understood by those skilled in the art that the foregoing and various other changes, omissions and additions may be made therein and thereto, without departing from the spirit and scope of the invention.

We claim:

1. Apparatus for digitizing a cyclical automotive cylinder ignition signal having a maximum value occurring at spark and varying frequency and amplitude thereafter, comprising:

sensor means, for providing a sensed signal indicative of the actual value of an automotive cylinder ignition parameter; and signal processing means, responsive to said sensed signal, for sampling of said sensed signal at first predetermined time intervals and providing signals indicative of the value of said sensed signal sampled thereat, for comparing each said sampled first interval signal to a predetermined threshold signal to determine a transition occurrence of said sensed signal towards a maximum spark value, for sampling of said sensed signal, following said sensed signal transition occurrence, at said second intervals for a predetermined number of said second intervals and providing signals indicative of the value of said sensed signal sampled thereat, for determining a maximum spark value signal from among said sampled second interval signals, for sampling of said sensed signal, following said predetermined number of second intervals, at said third intervals and providing signals indicative of the value of said sensed signal sampled thereat, said first, second and third intervals being shorter in duration than a fourth predetermined time interval, and for determining a maximum displacement signal during each said fourth interval as the one of said sampled third interval signals sampled during an associated one of said fourth intervals having the greatest absolute value displacement from a maximum displacement signal determined during a preceding one of said fourth intervals.

2. The apparatus of claim 1, wherein said signal processing means further comprises memory means for storing signals, said signal processing means storing in said memory means any one of said sampled first interval signals during each corresponding one of said fourth intervals in which said sensed signal transition occurrence has not occurred, said maximum spark value signal, and each said maximum displacement signal.

3. The apparatus of claim 2, further comprising display means, responsive to said stored sample signals, for displaying each said stored signal thereon as a point in an amplitude versus time graphical display format, said signal processing means determining said fourth predetermined time interval from the display resolution of said display means, whereby said graphical display format is a digitized version of said sensed signal.

4. The apparatus of claim 1, wherein said signal processing means further includes sampling means, said sampling means sampling said sensed signal at predetermined time intervals and providing digital signals indicative of the value of said sensed signal sampled thereat.

5. The apparatus of claim 4, wherein said sampling means comprises an analog to digital converter.

6. The apparatus of claim 4, wherein said signal processing means further includes digital signal processing means, responsive to said sampling means digital signals, for reading said sampling means digital signals at said first, second, and third predetermined time intervals.

7. The apparatus of claim 1, wherein said automotive cylinder ignition parameter is primary ignition.

8. The apparatus of claim 1, wherein said automotive cylinder ignition parameter is secondary ignition.

9. The apparatus of claim 3, wherein said display means comprises a video monitor.

10. Apparatus for digitizing an automotive engine signal having varying frequency and amplitude, comprising:

sensor means, for providing a sensed signal indicative of the value of an automotive engine parameter; and signal processing means, responsive to said sensed signal, for sampling the value of said sensed signal at first predetermined time intervals and providing signals indicative of the value of said sensed signal sampled thereat, said first interval being shorter in duration than a second predetermined time interval, and for determining a maximum displacement signal during each said second interval as the one of said sampled first interval signals sampled during an associated one of said second intervals having the greatest absolute value displacement from a maximum displacement signal determined during a preceding one of said second intervals.

11. The apparatus of claim 10, wherein said signal processing means further comprises memory means for storing signals, said signal processing means storing in said memory means each said maximum displacement signal.

12. The apparatus of claim 11, further comprising display means, responsive to said stored sample signals, for displaying each said stored signal thereon as a point in an amplitude versus time graphical display format, said signal processing means determining said second predetermined time interval from the display resolution of said display means, whereby said graphical display format is a digitized version of said sensed signal.

13. The apparatus of claim 10, wherein said automotive parameter alternator diode/stator voltage.

14. The apparatus of claim 10, wherein said signal processing means includes sampling means, said sampling means sampling said sensed signal at predetermined time intervals and providing digital signals indicative of the value of said sensed signal sampled thereat.

15. The apparatus of claim 14, wherein said sampling means comprises an analog to digital converter.

16. The apparatus of claim 14, wherein said signal processing means includes digital signal processing means, responsive to said sampling means digital signals, for reading said sampling means digital signals at said first predetermined time intervals.

17. The apparatus of claim 12, wherein said display means comprises a video monitor.

* * * * *